United States Patent [19]

Brodmann et al.

[11] 4,140,534

[45] Feb. 20, 1979

[54] PROCESS FOR PRODUCING SYNTHETIC MAGNESITE - DOLOMITE SINTER

[75] Inventors: Franz J. Brodmann, Philadelphia, Pa.; Ronald Staut, Cherry Hill, N.J.

[73] Assignee: General Refractories Company, Bala Cynwyd, Pa.

[21] Appl. No.: 883,823

[22] Filed: Mar. 6, 1978

[51] Int. Cl.² .............................................. C04B 35/04
[52] U.S. Cl. ........................................ 106/58; 106/63
[58] Field of Search .............. 423/169, 635, 636, 637; 106/58, 63

[56] References Cited

U.S. PATENT DOCUMENTS 2,694,620  11/1954  Lathe .................................. 423/637
2,898,194  8/1959  Eells et al. ........................... 423/169

Primary Examiner—James Poer
Attorney, Agent, or Firm—Brian G. Brunsvold; Thomas L. Irving; Everett H. Murray, Jr.

[57] ABSTRACT

A method of increasing the magnesia content in dolomite sinter produced from dolomite. Crushed dolomite is calcined to form a physical mixture of particulate magnesium oxide (MgO) and calcium oxide (CaO) and the mixture is hydrated to develop a size differential between the calcium hydroxide and the magnesium hydroxide. The hydroxides are dried without dehydration and separated into two component portions on the basis of size. One portion of the mixture is rich in Ca(OH)$_2$ and the other is rich in Mg(OH)$_2$. The portion of the mixture primarily comprised of Mg(OH)$_2$ is then calcined to form the synthetic sinter.

8 Claims, No Drawings

PROCESS FOR PRODUCING SYNTHETIC MAGNESITE - DOLOMITE SINTER

BACKGROUND OF THE INVENTION

Pure dolomite rock is entirely composed of the mineral dolomite, which is a solid solution of calcium and magnesium carbonate with the formula $CaMg(CO_3)_2$. Dolomite sinter, produced from dolomite by means well-known in the art, consists of approximately 40 weight percent MgO and 60 weight percent CaO and possesses a continuous CaO matrix with isolated pockets of MgO.

Because the calcium oxide tends to hydrate faster than magnesia and also because calcium oxide has a lower resistance to high iron slags, it is desirable to increase the MgO concentration in dolomite sinter to produce a refractory having a continuous MgO matrix. Dolomite sinter of increased MgO content is referred to in the art as synthetic magnesite-dolomite sinter. Such synthetic sinter, having a higher hydration and slag resistance than ordinary dolomite, represents an excellent refractory material for basic oxygen furnace linings, especially when high iron slags are involved.

The prior art describes various processes for the production of magnesite-dolomite sinter from dolomite. One such process adds a magnesium hydroxide $(Mg(OH)_2)$, commonly called brucite, slurry to hydrated dolomite to increase the magnesia (MgO) content. In another process, calcium compounds are chemically dissolved from the dolomite to produce a synthetic sinter containing up to 98% pure MgO.

The present process invention distinguishes over all known prior art processes directed to the production of synthetic magnesite-dolomite sinter by utilizing the different hydration rates of calcium hydroxide $(Ca(OH)_2)$, commonly called portlandite, and $Mg(OH)_2$. Further, the method of the present invention is relatively inexpensive and lends itself to large scale production. The inventive process increases magnesia content in dolomite sinter up to about 75% by weight.

SUMMARY OF THE INVENTION

The present invention is a method for producing synthetic magnesite-dolomite sinter of increased magnesia content from crushed dolomite. The first step of the method involves calcining the dolomite to form a physical mixture of particulate MgO and CaO. The relative size of the particles of the calcium compound in the mixture is then increased by placing the mixture under hydrating conditions to form a mixture of $Ca(OH)_2$ and $Mg(OH)_2$. The hydrated mixture is then dried without dehydration. The dried mixture is separated, on the basis of particle size, into two components, a first component primarily comprised of $Ca(OH)_2$ and a second component primarily composed of $Mg(OH)_2$. Finally, the second component of the separated mixture is calcined to form the synthetic dolomite sinter.

It is understood that the foregoing general description and the following detailed description are only illustrative and exemplary, and that modifications, neither departing from the spirit nor the scope of the present invention, will be obvious to those skilled in the art.

DETAILED DESCRIPTION OF THE INVENTION

The starting material for applicants' process is crushed, commercial dolomite. The particle size of the dolomite normally falls within the range of about ¼ to 1.0 inches in diameter.

The first step of the method is calcining the crushed dolomite to form a physical mixture of particulate MgO and CaO. Calcining is performed by means well-known in the art. Preferably, the crushed dolomite is calcined at a temperature of approximately 900° C. Higher calcining temperature tend to reduce the hydration rate of CaO and are, therefore, not desirable.

During calcining, dolomite decomposes in a three step process into a physical mixture of MgO and CaO. The average particle size of both the MgO and CaO is less than 1 micron in diameter after calcining. Furthermore, the average size of the MgO particles is approximately equal to the average size of the CaO particles.

The next step of the method is to increase the relative size of the particles of calcium compound in the mixture. The calcium oxide (CaO) and magnesium oxide (MgO) hydrate at different rates to form a mixture of $Ca(OH)_2$ and $Mg(OH)_2$. The $Ca(OH)_2$ particles, because of their higher rate of hydration, become up to several times larger in size than the $Mg(OH)_2$ crystals. Hydration, also known in the art as slaking, is carried out at atmospheric pressure and at a maximum temperature of about 107° C. in order to achieve optimum differential crystal growth behavior of the $Ca(OH)_2$ and the $Mg(OH)_2$. Alternatively, the dolomite can be hydrated by autoclaving; however, in such case, the MgO percent in the component containing smaller sized particles, primarily composed of $Mg(OH)_2$, is generally lower.

Hydration is followed by drying. The drying step is performed at temperatures less than about 300° C. in order to avoid dehydration of either the $Mg(OH)_2$ or the $Ca(OH)_2$. After drying, the average particle of $Mg(OH)_2$ is about 0.5–1.0 microns in diameter, whereas the average particle of $Ca(OH)_2$ is about 1–5 microns in dimater.

The drying is followed by separating the mixture on the basis of particle size.

Recent advances in fine particle separation technology, now known in the art, provide the means to separate particles within the size range of $Mg(OH_2$ and $Ca(OH)_2$, formed by practice of the present invention. To accomplish this, the dried, hydrated dolomite is preferably dispersed in what is known as an air classifier where a compressed air stream subjects the particles to centrifugal force and aerodynamic drag in different directions to effect the separation. Preferably, by such means, that are well-known in the art, the particles are separated or cut at a size of 0.5 microns in diameter. Accordingly, the hydrated mixture is separated into two components, a fine, or smaller-sized component (minus 0.5 microns), primarily comprised of $Mg(OH)_2$, and a coarse or larger component (plus 0.5 micron), primarily comprised of $Ca(OH)_2$. Although the separation is not complete, the proportion of magnesium compound in the component having primarily the smaller-sized crystals is much larger than in the original dolomite sinter, the increased percentage being up to 75%.

The final step of the method includes calcining the smaller-sized component of the separated mixture, primarily comprised of $Mg(OH_2$, to form the synthetic dolomite sinter. Preferably, the smaller-sized component is either pelletized or modulized by means well-known in the art, prior to calcining. Calcining is then carried out by means well-known in the art at a temperature ranging from about 1426° to 2204° C.

The following examples will serve to demonstrate both the yield of the smaller-sized component, hereinafter referred to as fines, and the MgO enrichment for starting materials under various separation conditions. The yield is calculated by dividing the weight of fines collected by the weight of starting material. In the examples, all weight percentages of the separated fractions are reported on a calcined basis. Standard chemical analysis, well-known in the art, was utilized to determine the percentages.

The examples are not to be construed as limitations of the invention. Various other embodiments, modifications and equivalents of these examples will readily suggest themselves to those skilled in the art without departing from the spirit or the scope of the present invention.

EXAMPLE 1

Commercial crushed dolomite rock, consisting of approximately 40 weight percent MgO and 60 weight percent CaO and of particle sizes in the range of ¼–1 inch in diameter, was calcined at 900° C. Thereafter, the mixture was continuously slaked in a hydrator under atmospheric pressure at a maximum temperature of about 107° C.

After drying at a temperature of less than about 300° C., 1.5 pounds of hydrated dolomite was fed at a rate of 22 pounds per hour into a particle size classifier capable of separating particles within the 0.5–50 micron range. The material was first dispersed in a compressed air stream and then separated at a particle size of approximately 0.5 microns in the classification zone by an outwardly directed centrifugal force and inwardly directed drag force. The fine particles were removed spirally inward through a central outlet and subsequently collected in a bag house. The coarse particles moved outward around the periphery and were collected in cyclones.

The collected fines fraction contained 68.93% MgO and 31.07% CaO. The coarse fraction contained 34.10% MgO and 65.90% CaO. At this feed rate, a 25% yield for the fines was achieved.

EXAMPLE 2

All conditions and materials were the same as described in Example 1 except that the feed rate of the dried dolomite starting material input to the classifier was reduced to 6.6 pounds per hour. The collected fines contained 73.31% MgO and 26.69% CaO, and the larger fraction contained 31.9% MgO and 68.90% CaO. However, only a 10% yield for the fines was achieved.

EXAMPLE 3

Under otherwise equal conditions as described in Example 1 and Example 2, the feed rate was further reduced to 5.0 pounds per hour. The fines contained 69.98% MgO and 30.22% CaO and the larger fraction contained 70.30% CaO and 29.70% MgO. The yield of fines was 40%.

EXAMPLE 4

Dolomite of the type in Example 1 was calcined at 900° C. and subsequently autoclaved at 125 psi steam pressure and 176° C. The hydrated material was then separated in the same manner as described in Examples 1 through 3. At a feed rate of 12.0 pounds per hour, the fines contained 52.71% MgO and 47.29% CaO and the larger fraction contained 37.16% MgO and 62.84% CaO. This separation test produced a yield of 18% fines.

EXAMPLE 5

The calcined dolomite was fired, autoclaved, and separated as in Example 4. However, the feed rate was lowered to 7.0 pounds per hour, which increased the yield to 30% fines. The composition of the fines fraction ws 61.09% MgO and 38.51% CaO and that of the larger fraction 36.14% MgO and 63.86% CaO.

What is claimed is:

1. A method of increasing the magnesia content in dolomite sinter produced from crushed dolomite comprising the steps of:
    (a) calcining said dolomite to form a physical mixture of particulate MgO and CaO;
    (b) increasing the relative size of the particles of calcium compound in said mixture by placing said mixture under hydrating conditions to form a mixture of $Ca(OH)_2$ and $Mg(OH)_2$;
    (c) drying the hydrated mixture without dehydration;
    (d) separating the dried mixture on the basis of particle size into two components, a first component primarily composed of $Ca(OH)_2$ and a second component primarily comprised of $Mg(OH)_2$; and
    (e) calcining said second component of the separated mixture to form said dolomite sinter.

2. The method of claim 1 wherein said physical mixture of particulate MgO and CaO has an average particle size less than 1 micron.

3. The method of claim 2 wherein the separation based on particle size is conducted at a particle size of approximately 0.5 microns,.

4. The method of claim 1 wherein said hydrating conditions are at atmospheric pressure and at a maximum temperature of about 107° C.

5. The method of claim 1 wherein the first calcining step is carried out at a temperature of approximately 900° C.

6. The method of claim 1 wherein the average particle size of the $Mg(OH)_2$ after drying is in he range of from 0.5 to 1.0 microns.

7. The method of claim 1 wherein the average particle size of the $Ca(OH)_2$ after drying is in the range of from 1 to 5 microns.

8. The method of claim 1 wherein the drying step is performed at temperatures less than about 300° C.

* * * * *